Figure 1:
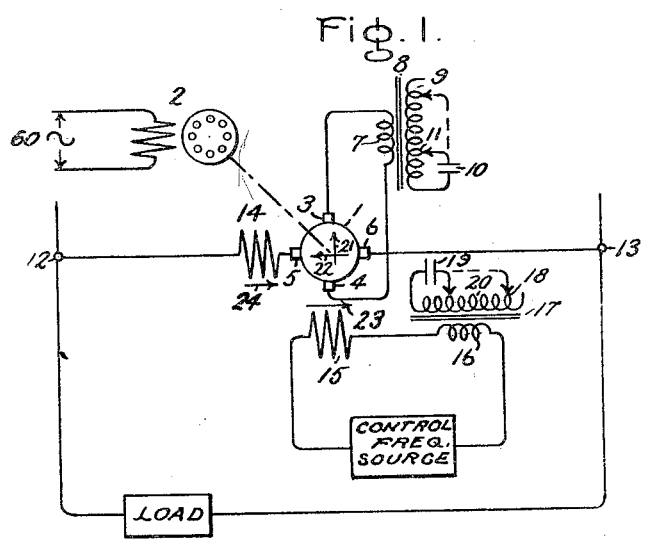

Patented Dec. 27, 1949

2,492,758

UNITED STATES PATENT OFFICE 2,492,758

DYNAMOELECTRIC MACHINE

Frank W. Merrill, Fort Wayne, Ind., assignor to General Electric Company, a corporation of New York Application November 14, 1947, Serial No. 785,849

8 Claims. (Cl. 322—92)

This invention relates to commutating type dynamoelectric machines of the type in which the armature reaction provides a major source of excitation.

A dynamoelectric machine of the armature reaction excited variety normally comprises a rotor or armature having a winding and a commutator of the type used in conventional direct current machines. The major component of excitation in this type of machine is provided by the armature reaction flux produced by current flowing in the armature winding. To facilitate the production of this armature reaction, a plurality of mutually displaced brush sets is provided, at least one set being connected to a low resistance circuit amounting essentially to a short circuit. Another set of brushes is connected to a load circuit when the machine is used as a generator or to a power supply circuit when it is used as a motor. The stationary member of such a machine is arranged to provide paths of low reluctance for the various magnetic fluxes set up by the armature currents, and is provided with various windings to improve or control the operation of the machine. These stator windings include an exciting or control winding for inducing the voltage in the quadrature rotor circuit, which produces the heavy flow of current in the low resistance path provided, which in turn produces the desired main field, heavy armature reaction flux. In the most effective constructions, a compensating winding is provided to neutralize substantially the armature reaction attributable to the current flowing to the load when the machine is used as a generator or from the power supply source when the machine is used as a motor. With such an arrangement, this type of dynamoelectric machine, used as a direct current excited generator, can be made by appropriate design of the various circuits to provide a variable voltage or variable current output with rapid response to adjustment of the control field excitation and a very high amplification ratio between the change in output and the change in input to the control field. When this type of machine is used as a direct current driven motor, the control field gives exceptionally accurate control of speed with low energy input, and the machine is thus adaptable for use with simple low energy speed regulation systems. A dynamoelectric machine of the type described above is generally referred to as an "amplidyne," the term referring to an armature reaction excited dynamoelectric machine having a control field winding, a low resistance quadrature circuit brush path, and a compensating winding for neutralizing the secondary armature reaction.

Application Serial No. 785,846, Patent No. 2,483,151, filed November 14, 1947, of William A. Pringle, and assigned to the assignee of the present application, discloses means for operating an amplidyne motor from a source of alternating current, or for causing an amplidyne generator to generate alternating current, when excited by alternating current, by providing appropriately selected means for tuning the inductive windings of the machine. By tuning the control and quadrature circuits of a machine, otherwise primarily usable as a direct current excited amplidyne type generator with direct current output, it is possible to operate the machine as an alternating current generator from an alternating current excitation source. When thus excited, the frequency of the output voltage depends solely upon the frequency of the exciting power agency, which may be a very low energy source such as a vacuum tube oscillator, tuning fork, etc., and is independent of the number of poles and speed of the machine. Accordingly, low energy alternating current can be greatly amplified without change of the original frequency and the alternating current output can be regulated or controlled by suitable low energy means acting on one or more of the control fields.

Another important result of the application of the tuning principle to amplidyne type machines is the provision of an alternating current motor which can be run at an off-synchronous speed, the speed of the machine being independent of the number of poles and frequency of the power source and dependent only on the voltage applied, the amount of quadrature (main field) flux, load, windings, and temperature. Moreover, because of the high amplification inherent in an amplidyne motor, a very low energy speed regulating device can be used.

An object of this invention is to provide an improved alternating current dynamoelectric machine of the amplidyne type.

Another object of this invention is to provide an improved alternating current dynamoelectric machine of the amplidyne type in which one set of tuning capacitors can be used over the entire operating frequency range of the machine.

A further object of this invention is to provide an improved variable speed alternating current motor.

A still further object of this invention is to provide an improved alternating current generator wherein the frequency generated is independent of the speed of the machine.

Further objects and advantages of this invention will become apparent and this invention will be better understood from the following description referring to the accompanying drawings, and the features of novelty which characterize this invention will be pointed out with particularity in the claims annexed to and forming a part of this specification.

Figure 2:
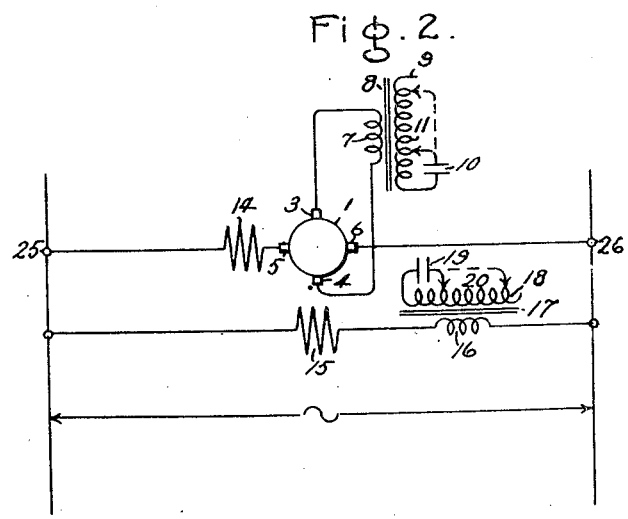

In the drawing Fig. 1 illustrates schematically an alternating current amplidyne generator utilizing the method of tuning of this invention, and Fig. 2 illustrates the method of tuning of Fig. 1 applied to an alternating current amplidyne motor.

A feature of this invention is the provision of transformer means having one winding connected in the amplidyne circuit to be tuned and having the tuning capacitor connected across another winding by means of a plurality of taps. This arrangement permits adjustment for the proper tuning capacitance by merely selecting the proper taps thereby allowing the use of only one tuning capacitor of reasonable size for the entire operating frequency range of the machine.

Referring now to Fig. 1, there is shown an alternating current amplidyne generator having a rotatable armature 1 provided with a commutator connected to an armature winding of the conventional direct current type and adapted to be driven by a suitable source of mechanical power such as induction motor 2. In this schematic presentation, the stationary member with its associated pole pieces is not shown. The armature 1 is provided with a set of primary or quadrature brushes 3 and 4 and a set of secondary or direct axis brushes 5 and 6 displaced about the commutator from the primary brush set by 90 electrical degrees. The quadrature and direct axis brush sets provide quadrature and direct axis or load circuits respectively through the armature 1.

The quadrature circuit includes the armature windings between quadrature brushes 3 and 4 and primary 7 of insulating transformer 8. Quadrature tuning capacitor 10 is connected across the secondary 9 of transformer 8 by means of taps 11. The direct axis brushes 5 and 6 are connected across the load at terminals 12 and 13 and compensating field 14 in series with the direct axis brushes serves to neutralize substantially the secondary armature reaction produced by current flowing in the direct axis circuit. The control field winding 15 is adapted to be energized from a low energy master frequency source such as a signal generator or tuning fork and is arranged in series with primary 16 of insulating transformer 17. The control field tuning capacitor 19 is connected across transformer secondary 18 by means of taps 20.

Since the quadrature circuit through transformer winding 7 and quadrature brushes 3 and 4 is of inherently low impedance, a very small amount of excitation flux will generate a sufficient voltage across the quadrature brushes 3 and 4, when the armature is rotating, to produce a relatively large primary or quadrature current flow through that part of the armature winding which is connected between these brushes. This quadrature armature current produces a magnetic flux or primary (quadrature) armature reaction along the quadrature axis as indicated by the arrow 21 (all arrows represent instantaneous conditions for a given polarity or half-cycle of the exciting source). As the armature 1 rotates, the conductors which are connected to the secondary or direct axes brushes 5 and 6 will be cut by the quadrature armature reaction flux and a voltage will be induced between these brushes. Since these brushes are connected to the load, a secondary or direct axis load current will flow through the direct axis circuit of the armature 1 producing a secondary or direct axis armature reaction along the axis of the direct axis brushes as shown by the arrow 22.

In order to control the secondary voltage and load characteristics of the generator, a field exciting winding 15 is arranged to provide a feeble magnetic excitation along the direct axis of the machine, as shown by the arrow 23, which excitation induces a small electromotive force in the armature winding between the quadrature brushes 3 and 4. This small electromotive force in turn produces a relatively high quadrature current between these brushes by virtue of the low impedance of the quadrature circuit, as explained above.

It will be noted that the control of the quadrature flux, and hence the control of the secondary voltage, by the small amount of energy supplied to the control field 15, would not be possible unless the direct axis armature reaction, as indicated by the arrow 21, were not completely neutralized. This is due to the fact that the secondary armature reaction and excitation supplied by the control field fall along the same axis. In the case of a generator, as shown here, the secondary armature reaction and control field excitation are opposed; however, in a motor they are additive. Since the secondary armature reaction is of much greater magnitude than the control field excitation, whether the relationship be additive or in opposition, it will override and destroy the effect of the control field flux unless neutralized. To accomplish this result, compensating field winding 14 is provided which produces an mmf., shown by the arrow 24, which is in the same plane with and opposes the secondary armature reaction 21 and thus substantially neutralizes the magnetic back coupling of electric current in the direct axis circuit of the armature.

With the direct axis compensating system described above, the control field 15 is only required to supply a relatively small amount of excitation, and may therefore be designed for very low current input, increasing its ratio of resistance to inductance and thereby increasing the speed of response and sensitivity to control. Therefore, a compensated amplidyne type of generator can be made to have a high amplification factor due to the relatively small amount of power required to excite the control field winding.

The quadrature tuning capacitor 10 and the control field tuning capacitor 19 are provided in accordance with the invention of the aforesaid application Serial No. 785,846 in order to enable an amplidyne type machine, otherwise primarily usable as a direct current device, to be operated on alternating current. It is well known that a series direct current motor will continue to run in the same direction when the polarity of the voltage applied is reversed, this result being due to the simultaneous reversal of the field flux and an armature current. It has, however, been generally considered impractical to operate shunt excited machines, and by analogy armature reaction excited machines, from alternating current, because inductance effects make it apparently impossible to synchronize to the necessary degree the alterations of the armature current and the excitation flux. The aforementioned application Serial No. 785,846 discloses that in the case of amplidyne type machines, the difficulty can be overcome by appropriately tuning certain of the critical circuits.

The above referred to application disclosed that in an amplidyne type machine operated from 5 to 20 cycles, it was only necessary to tune the control field circuit, but that from 20 to 200 cycles, both the control field and quadrature circuits must be tuned, as illustrated in Fig. 1 of this application. It was also disclosed that in a certain fractional horsepower size machine at 60 cycles, a capacitor of .4 mf. was sufficient to adequately tune the control field circuit, while a capacitor of 450 mf. was required for the quadrature circuit. It was also found that for frequency of 200 cycles, all circuits, i. e., quadrature, direct axis, and control field, had to be tuned.

With this tuning, an amplidyne type machine arranged as a generator will generate alternating current of a frequency independent of the speed of the number of poles of the machine, the frequency being determined entirely by the frequency applied to the control field, and, due to the inherent amplification characteristics of this type of machine, the excitation required to be applied to the control field can be of relatively low power such as can be supplied from a signal generator, i. e., on the order of 2 to 4 watts. When an amplidyne motor has its circuits tuned as described above, a variable speed alternating current motor is provided wherein the speed does not depend on the frequency and number of poles, but depends only on the excitation applied (quadrature flux), the line voltage, the load, the windings, and the temperature. Moreover, because of the high amplification factor of an amplidyne motor, a very low energy speed regulating device can be employed in connection with the control field.

In order to operate the alternating current amplidyne generator described above over a wide range of frequency, tuning capacitors of varying capacitances must be utilized in order to neutralize the inductive effect of the windings over the complete operating range of frequency. For instance, the necessary value of a quadrature tuning capacitor for a 60 cycle input impressed on the control field of a certain generator was found to be 1900 mf. In order to permit the use of capacitors of more practical value, the arrangement now to be described is provided. The tuning necessary to permit operation on alternating current is provided by quadrature capacitor 10 and control field capacitor 19 and insulating transformers 8 and 17 respectively arranged in the quadrature and control field circuits. As described above, transformer 8 has its primary 7 arranged in series with the quadrature brushes 3 and 4 and capacitor 10 is connected across secondary 9 through taps 11. Transformer 17 is arranged with its primary 16 in series with the control field 15 and capacitor 19 is connected across the secondary 18 through taps 20.

This arrangement permits simple adjustment for the proper tuning capacitance for the entire operating frequency range of the machine and utilizes only one capacitor of reasonable size in each circuit. Therefore, while a 1900 mf. capacitor would be required to directly tune the quadrature circuit for 60 cycle excitation, a 19 mf. capacitor can be used with a 10 to 1 turn ratio between the turns of primary 7 and secondary 9 of transformer 8, the proper ratio being selected on taps 11. It is to be understood that an autotransformer can be utilized instead of the transformer shown in Fig. 1.

Referring now to Fig. 2, there is shown the improved tuning arrangement of Fig. 1 applied to an alternating current amplidyne motor. Here, armature 1 is provided with quadrature brushes 3 and 4 and direct axis brushes 5 and 6. Insulating transformer 8 has its primary 7 arranged in series with the quadrature brushes 3 and 4 and quadrature tuning capacitor 10 is connected across secondary 9 through taps 11. The direct axis circuit which includes compensating field 14 in series with direct brushes axis 5 and 6 is connected across the alternating current power supply line 25 and 26. The control field circuit including control field winding 15 and primary 16 of insulating transformer 17 is also connected across power supply line 25—26. Control field tuning capacitor 19 is connected across secondary 18 of transformer 17 by means of tabs 20.

In this motor, control field 15 supplies a feeble excitation flux which induces a voltage across quadrature brushes 3 and 7 which in turn produces, by virtue of the low impedance of the quadrature circuit, a relatively heavy flow of current through the armature windings between the brushes 3 and 4. This heavy flow of quadrature armature current produces the quadrature armature reaction flux which coacts with the current flowing in the direct axis circuit from alternating current power supply line 25—26, through compensating field 14 and the armature windings between brushes 5 and 6, to produce the motor torque. The tuning arrangement including quadrature insulating transformer 8 with quadrature capacitor 10 and control field insulating transformer 17 with control field tuning capacitor 19 is used, as described above, to permit the utilization of tuning capacitor of reasonable size over the entire operating frequency range of the motor.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit respectively through said rotatable member, a circuit including a field exciting winding for controlling the secondary characteristics of said machine, a second field winding for substantially neutralizing the armature reaction produced by current in said secondary circuit, transformer means having a winding connected in one of said circuits, and capacitor means connected across another winding of said transformer means for substantially neutralizing the inductive reactance of the circuit associated with said transformer.

said last named winding of said transformer having taps for selecting the proper ratio between the turns of said last named winding and the other winding.

2. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit respectively through said rotatable member, a field exciting circuit including a field exciting winding for controlling the secondary characteristics of said machine, a second field winding for substantially neutralizing the armature reaction produced by current in said secondary circuit, transformer means having a winding in said primary circuit, and a second transformer means having a winding in said field exciting circuit, each of said transformers having a capacitor connected across another winding thereof for substantially neutralizing the inductive reactance of said primary and field exciting circuits respectively.

3. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit respectively through said rotatable member, a field exciting circuit including a field exciting winding for controlling the secondary characteristics of said machine, a second field winding for substantially neutralizing the armature reaction produced by current in said secondary circuit, transformer means having a winding in said primary circuit, and a second transformer means having a winding in said field exciting circuit, each of said transformers having a capacitor connected across another winding thereof for substantially neutralizing the inductive reactance of said primary and field exciting circuits respectively, each of said last named transformer windings having taps for selecting the proper ratio between the turns of said last named winding and the other winding.

4. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit respectively through said rotatable member, a field exciting circuit including a field exciting winding for controlling the secondary characteristics of said machine, a second field winding for substantially neutralizing the armature reaction produced by current in said secondary circuit, transformer means having a primary winding in series with one of said circuits and a secondary winding provided with taps, and capacitor means connected across the taps of said secondary winding of said transformer for substantially neutralizing the inductive reactance of said primary winding circuit.

5. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit respectively through said rotatable member, a field exciting circuit including a field exciting winding for controlling the secondary characteristics of said machine, a second field winding for substantially neutralizing the armature reaction produced by current in said secondary circuit, a transformer having a primary winding in series with said primary circuit, a second transformer having a primary winding in series with said field exciting circuit, each of said transformers having a secondary winding provided with taps, and capacitors respectively connected across the taps of each of said transformer secondary windings for substantially neutralizing the inductive reactance of said primary and field exciting circuits.

6. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit respectively through said rotatable member, a field exciting circuit including a field exciting winding for controlling the secondary characteristics of said machine, a second field winding for substantially neutralizing the armature reaction produced by current in said secondary circuit, capacitor means for substantially neutralizing the inductive reactance of one of said circuits, and adjustable insulating means between said capacitor and the circuit associated with said capacitor whereby a single capacitor can be used to neutralize the inductive reactance of its associated circuit over the range of operating frequency of said machine.

7. An alternating current generator of the armature reaction excited type having a stationary member and a rotatable member provided with a commutator, a set of primary brushes and a set of secondary brushes electrically displaced from said primary brush set adapted to provide a primary and a secondary circuit respectively through said rotatable member, a field exciting circuit including a field exciting winding for controlling the secondary characteristics of said machine, a second field winding for substantially neutralizing the armature reaction produced by current in said secondary circuit, a transformer having a primary winding in series with said primary circuit, a second transformer having a primary winding in series with said field exciting circuit, capacitor means respectively connected across the secondary winding of said transformer for substantially neutralizing the inductive reactance of said primary and field exciting circuits, each of said transformer secondary windings having taps for selecting the proper ratio between the turns of said primary winding and said secondary winding whereby a single capacitor can be used to neutralize the inductive reactance of its associated circuit over the operating frequency range of said machine.

8. An alternating current motor of the armature reaction excited type having a stationary member and a rotatable member provided with a commutator, a set of primary brushes and a set of secondary brushes electrically displaced from said primary brush set adapted to provide a primary and a secondary circuit respectively through said rotatable member, a field exciting circuit including a field exciting winding for controlling the secondary characteristics of said machine, a second field winding for substantially neutralizing the armature reaction produced by current in said secondary circuit, a transformer having a primary winding in series with said primary circuit, a second transformer having a primary winding in series with said field exciting circuit, capacitor means respectively connected across the secondary winding of said transformer for substantially neutralizing the inductive reactance of said primary and field exciting circuits, each of said transformer secondary windings having taps for selecting the proper ratio between the turns of said primary winding and said secondary winding whereby a single capacitor can be used to neutralize the inductive reactance of its associated circuit over the operating frequency range of said machine.

FRANK W. MERRILL.

REFERENCES CITED

The following references are of record in the file of this patent:

UNITED STATES PATENTS

| Number | Name | Date |
|---|---|---|
| 1,389,110 | Wilson | Aug. 30, 1921 |
| 2,227,472 | Weathers | Jan. 7, 1941 |

FOREIGN PATENTS

| Number | Country | Date |
|---|---|---|
| 2,677 | Great Britain | of 1907 |